A. HORMEL.
ANTISKIDDING DEVICE FOR AUTOMOBILES AND SIMILAR VEHICLES.
APPLICATION FILED JAN. 31, 1911.
1,006,659.
Patented Oct. 24, 1911.
2 SHEETS—SHEET 1.
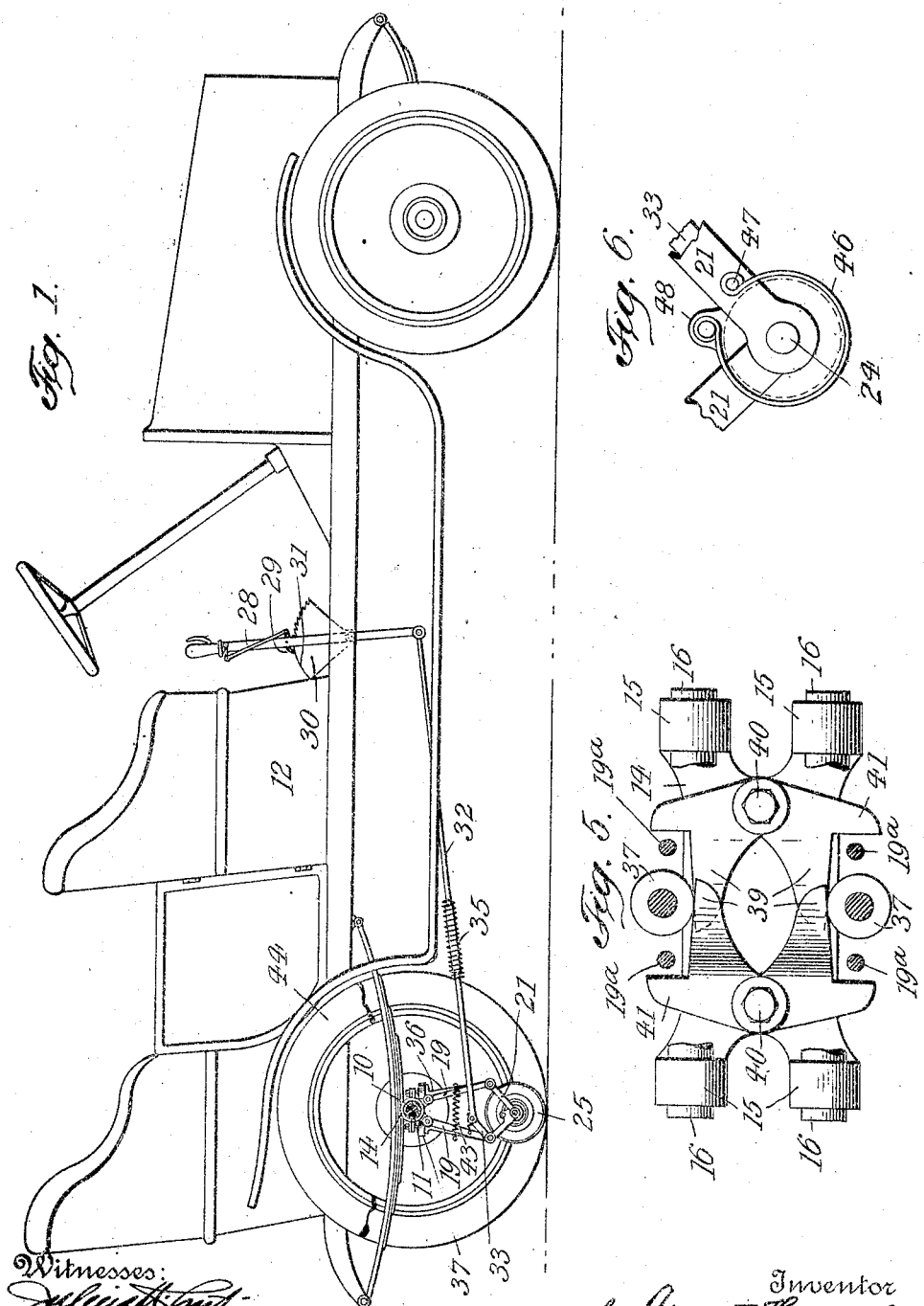

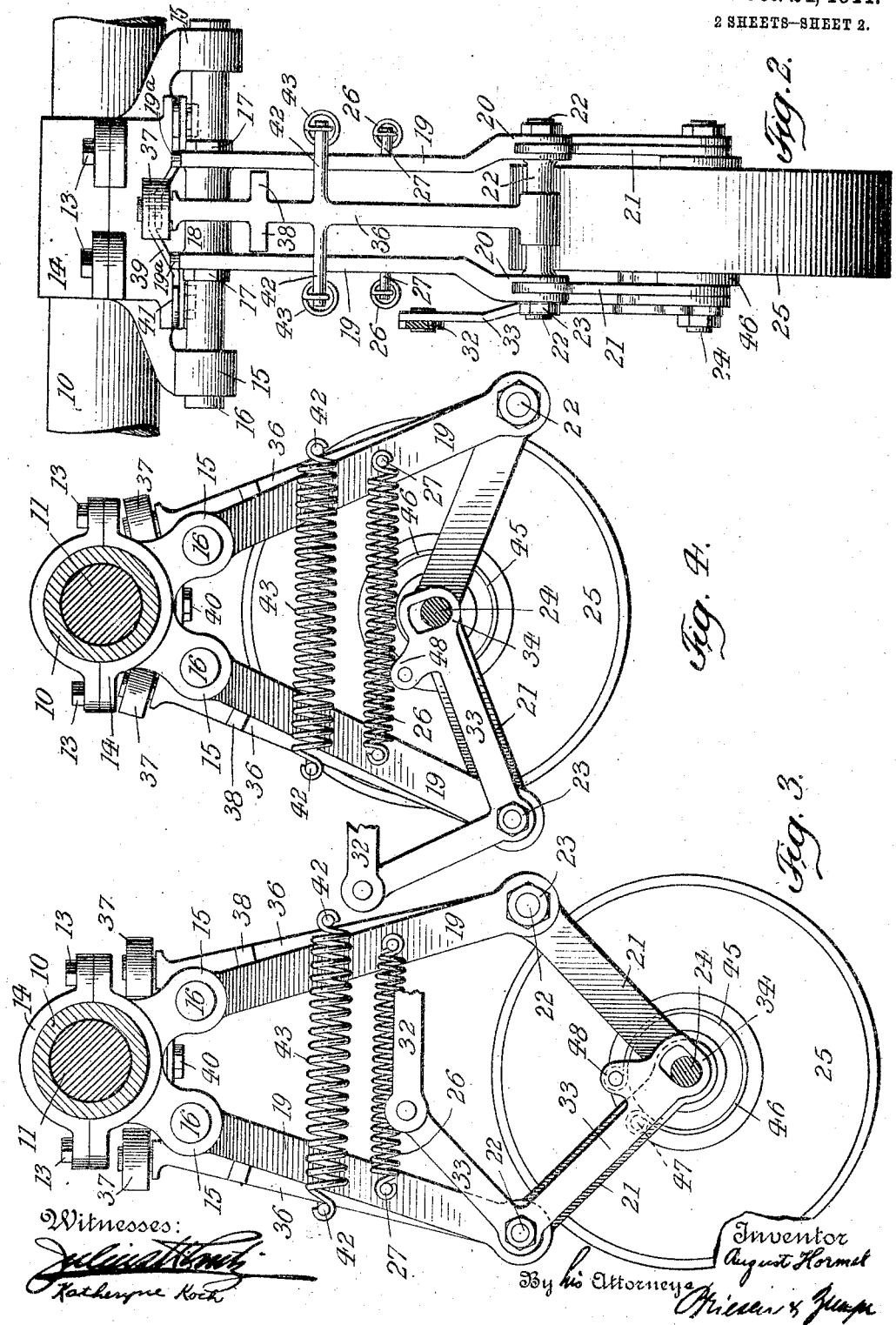

UNITED STATES PATENT OFFICE.

AUGUST HoRMEL, OF NEW YORK, N. Y., ASSIGNOR TO HORMEL AUTO-APPLIANCE COMPANY, OF NEW YORK, N. Y., A CORPORATION.

ANTISKIDDING DEVICE FOR AUTOMOBILES AND SIMILAR VEHICLES.

1,006,659.

Specification of Letters Patent.

Patented Oct. 24, 1911.

Application filed January 31, 1911. Serial No. 605,727.

*To all whom it may concern:*

Be it known that I, AUGUST HORMEL, a citizen of the United States, residing at New York city, county and State of New York, have invented a new and Improved Antiskidding Device for Automobiles and Similar Vehicles, of which the following is a specification.

This invention relates to a novel device for preventing the skidding of automobiles and similar vehicles in a longitudinal as well as in a lateral direction. For this purpose, a suitable trailing wheel is carried by a toggle depending from the vehicle body, which toggle is automatically contracted upon a lateral swerving of the car, so that the frictional contact between trailer and roadbed is correspondingly increased, and said movement is thus effectively checked. The trailer is further provided with readily operable braking means to prevent the car from sliding in a forward direction.

In the accompanying drawing: Figure 1 is a side view partly broken away of an automobile provided with an anti-skidding device embodying my invention; Fig. 2 a front view of the anti-skidding device proper; Fig. 3 a side view partly in section thereof; Fig. 4 a similar view showing the parts in different positions; Fig. 5 a bottom view partly in section of the sleeve and coöperating parts; and Fig. 6 a detail of the brake.

The device is shown to be secured to the casing 10 of the rear axle 11 of an automobile 12 although it may be attached to other parts of the vehicle body. To casing 10 is firmly secured by screws 13, a bipartite strap or fastening member 14 having two sets of opposed depending bearings 15. Within the latter are free to slide in an axial direction, a pair of shafts 16 to which are attached, by nuts 17, the hubs 18 of double arms 19. At their free ends, arms 19 are forked as at 20, to accommodate the upper ends of links 21, the parts 19, 21 constituting jointly a toggle. The forks 20 of each double arm 19 and the links 21 are connected by a transverse pin or pivot 22 carrying nuts 23, said pins constituting the toggle-knee. The lower overlapping ends of each set of coöperating links 21 are perforated to receive the axle 24 of a trailer wheel 25. The latter may be of any desired configuration and may for instance be provided with a grooved tread as more fully described in a copending application filed by me on even date herewith under Serial Number 605,726. Each pair of arms 19 flanking the trailer 25 is connected by a spring 26 secured to pins 27 projecting laterally from said arms, said spring 26 tending to collapse the toggles 19, 21.

Wheel 25 may be lowered or raised off the ground by means of a hand lever 28, a locking pawl 29 of which is adapted to engage a toothed sector 30 having a smooth section 31. Lever 28 is by sectional rod 32 connected to an elbow lever 33 that loosely turns on one of the pins 22 and is provided with an elongated eye 34 straddling axle 24 of trailer 25. The sections of rod 32 are connected by a spring 35 which constitute a yielding member intermediate the hand lever and the trailing device and thus compensates for occasional sagging etc. of the car frame when traveling over an uneven road bed.

When the trailer is to be lowered into the position shown in Figs. 1 and 3, lever 28 is swung backward so that pawl 29 rides on the smooth section 31 of sector 30 to allow springs 26 a free play for collapsing the toggle 19, 21 and for thus forcing the trailing wheel against the road bed. When lever 28 is swung forward, pawl 29 rides over the toothed section of sector 30, and as soon as axle 24 has passed beyond a straight line drawn through the toggle-knee, springs 26 will collapse the toggle 19, 21 to automatically maintain the trailer wheel in its raised position.

Means are provided for increasing the frictional contact between wheel 25 and the road bed whenever the car commences to swerve to the right and left. These means are shown to consist of levers 36 that turn loosely on pins 22 and are provided at their free ends with rollers 37, while cross pieces 38 arranged intermediate arms 19 maintain levers 36 properly centered. Each roller 37 engages a pair of overlapping levers or tappets 39 that are pivotally secured to sleeve 14 by screws 40 and have outer abutments 41. The latter are adapted to be engaged by pins or abutments 19ᵃ projecting upwardly from arms 19. Levers 36 are provided near their middle with laterally projecting pins 42 which are connected by comparatively strong springs 43 that act as spacers for said levers.

When the rear wheels 44 of the automobile start to swerve laterally, trailer 25 by being tightly forced against the road bed will not participate in this displacement, so that a relative axial movement between trailer 25 and casing 10 will take place. In this way shaft 16 together with arms 19 and levers 36 will be axially shifted within bearings 15, so that pins 19ª by impinging against abutments 41 will swing levers 39 outward to correspondingly spread the roller carrying upper sections of levers 36. As springs 43 prevent a spreading of the levers at the middle thereof, the lower ends of the arms will thus be moved toward each other to correspondingly straighten toggles 19, 21. It will be seen that the greater the swerving action of the car, the more the toggles 19, 21 will be straightened to gradually increase the frictional contact between the trailer and the road bed.

For preventing a forward skidding of the automobile, wheel 25 is provided with one or more annular offsets or brake rims 45. Rim 45 is straddled by a strap 46, one end of which is secured at 47 to one of the links 21 while its other end is secured to a lug 48 of elbow lever 33 in proximity to its eye 34. In operation, lever 28 is swung backward to tilt the lower arm of lever 33 downward and thereby tighten strap 46 around brake rim 45.

It will be seen that by the construction described, any undesirable forward or lateral skidding of the automobile is effectively prevented.

I claim:

1. A device of the character described, comprising a vehicle, double spring-toggles depending therefrom, an axle that pivotally connects the lower members of said toggles, a trailer carried by said axle, and means for automatically straightening the toggles upon a lateral movement of the vehicle to increase the frictional contact between the trailer and the road bed.

2. A device of the character described, comprising a vehicle, double spring-toggles depending therefrom, an axle that pivotally connects the lower members of said toggles, a trailer carried by said axle, means for automatically straightening the toggles upon a lateral movement of the vehicle to increase the frictional contact between the trailer and the road-bed, and means for raising the axle beyond a straight line drawn through the toggle-knees, whereby said toggles are first expanded and then partly collapsed, the toggle-spring tending to maintain the toggles in their collapsed position.

3. A device of the character described, comprising a vehicle, toggles depending therefrom, a trailing wheel carried by the toggles, levers coöperating therewith, means actuated upon a spreading of said levers for collapsing the toggles and thereby force the trailer against the road bed, and means for braking the trailing wheel.

4. A device of the character described, comprising a vehicle, axially slidable toggles depending therefrom, a trailing wheel carried by the toggles, levers pivoted at the toggle-knees, spacing springs connecting the levers, and tappets engaging the levers.

5. A device of the character described, comprising a vehicle, tappets carried thereby, axially slidable toggles depending from the vehicle, levers pivoted at the toggle-knees and engaging the tappets, first springs engaging the toggles for collapsing the same, and second springs connecting the levers near the middle thereof, to constitute fulcrums for the levers.

6. A device of the character described, comprising a vehicle, a fastening member carried thereby and having depending bearings and pivoted tappets, shafts slidable in said bearings, spring-influenced toggle-arms secured to the shafts, toggle links, a trailing wheel carried by said links, pivots connecting the arms and links, levers rotatable on said pivots and engaged by the tappets, and spacing springs connecting said levers.

7. A device of the character described, comprising a vehicle, a fastening member carried thereby and having depending bearings and pivoted tappets, shafts slidable in said bearings, spring influenced toggle-arms fast on the shafts, toggle-links, a trailing wheel carried thereby and having a brake rim, pivots connecting the arms and links, levers rotatable on said pivots and engaged by the tappets, spacing springs connecting said levers, an elbow lever rotatable on one of said pivots, and a brake strap encircling the brake rim and operatively connected to the elbow lever.

8. A device of the character described, comprising a vehicle, spring-influenced toggle-arms depending therefrom, toggle-links, pivots connecting said arms and links, a trailing wheel carried by the links, an elbow lever rotatable on one of said pivots, a trailer-brake operatively connected to said lever, a hand lever, and a spring-influenced sectional rod connecting said hand lever with the elbow lever.

9. A device of the character described, comprising a vehicle, spring-influenced toggle-arms depending therefrom, toggle-links, pivots connecting said arms and links, an axle hung in the links, a trailing wheel carried by said axle and having a brake rim, an elbow lever rotatable on one of the pivots and having an elongated eye that straddles the trailer-axle, a brake strap encircling the brake rim and secured to one of the links and to the elbow lever respectively, a hand lever, and a spring-influenced sectional rod connecting said hand lever with the elbow lever.

10. A device of the character described, comprising a vehicle, a fastening member carried thereby and having depending bearings and intermediate pivoted tappets, shafts slidable in said bearings, spaced double arms fast on said shafts, links pivoted to said arms, a trailing wheel hung in said links, levers fulcrumed to the link-pivots, cross pieces on said levers straddled by the double arms, rollers carried by the levers and engaged by the tappets, and spacing springs connecting the levers.

11. A device of the character described, comprising a vehicle, a fastening member carried thereby, toggle-arms slidably secured to said member and having upwardly extending abutments, toggle-links, pivots connecting said arms and links, a trailing wheel carried by the links, levers rotatable on said pivots, spacing springs connecting said levers, and tappets secured to the fastening member and adapted to be engaged by the abutments for spreading the levers.

12. A device of the character described, comprising a vehicle, toggles depending therefrom, said toggles being oscillative in parallelism with the longitudinal axis of said vehicle and laterally movable relatively thereto, a trailing wheel carried by the toggles, and tappets pivoted to said vehicle and adapted to collapse the toggles upon a lateral movement of the vehicle.

AUGUST HORMEL.

Witnesses:
ARTHUR E. ZUMPE,
KATHERYNE KOCH.